United States Patent
Howard et al.

(10) Patent No.: US 12,479,520 B2
(45) Date of Patent: Nov. 25, 2025

(54) COMPOSITE PANELS AND SYSTEM FOR ACTIVE FLOW CONTROL ON MOTOR VEHICLES

(71) Applicant: Ford Global Technologies, LLC, Dearborn, MI (US)

(72) Inventors: Kevin Howard, Plymouth, MI (US); Andres Arrieta Diaz, West Lafayette, IN (US); Karthik Boddapati, West Lafayette, IN (US); Michael Kelley, Southgate, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 418 days.

(21) Appl. No.: 18/154,430

(22) Filed: Jan. 13, 2023

(65) Prior Publication Data
US 2024/0239425 A1    Jul. 18, 2024

(51) Int. Cl.
*B62D 37/02* (2006.01)
*B62D 35/00* (2006.01)
*H02N 2/00* (2006.01)
*H10N 30/20* (2023.01)

(52) U.S. Cl.
CPC .......... *B62D 37/02* (2013.01); *B62D 35/007* (2013.01); *H02N 2/0015* (2013.01); *H02N 2/0075* (2013.01); *H10N 30/2047* (2023.02)

(58) Field of Classification Search
CPC ............ H10N 30/2047; H10N 2/0075; H10N 2/0015; B62D 37/02; B62D 35/007; B62D 35/00; B60R 16/02
See application file for complete search history.

(56) References Cited

U.S. PATENT DOCUMENTS

| | | | |
|---|---|---|---|
| 4,236,745 A | 12/1980 | Davis | |
| 4,257,641 A | 3/1981 | Keedy | |
| 4,682,808 A | 7/1987 | Bilanin | |
| 7,854,467 B2 | 12/2010 | McKnight et al. | |
| 8,790,777 B2 * | 7/2014 | Kozar | B29C 70/083 428/297.4 |
| 9,033,283 B1 | 5/2015 | Iemmelgarn et al. | |
| 9,821,915 B2 | 11/2017 | Giles et al. | |
| 10,023,249 B2 | 7/2018 | Breidenbach | |
| 11,046,415 B1 | 6/2021 | Pankonien et al. | |

(Continued)

FOREIGN PATENT DOCUMENTS

DE   102004055130   5/2006

OTHER PUBLICATIONS

JP S61196817 U with English Translation (Year: 1986).*

(Continued)

*Primary Examiner* — Lori Lyjak
(74) *Attorney, Agent, or Firm* — Burris Law, PLLC

(57) ABSTRACT

A composite panel includes a matrix, actuator elements disposed within the matrix or secured to an exterior surface of the composite panel, a plurality of slits, and an electrical termination area coupled to the shape memory fibers/elements. The plurality of slits are arranged parallel to each other and extend through at least a portion of a thickness of the composite panel. A power supply is configured to apply a burst voltage to the shape memory fibers/elements to change a shape of the composite panel, thereby modifying an airflow extending across the composite panel during operation.

20 Claims, 7 Drawing Sheets

(56) References Cited

U.S. PATENT DOCUMENTS

| | | | |
|---|---|---|---|
| 11,084,543 B2 | 8/2021 | Howard et al. | |
| 2005/0121240 A1* | 6/2005 | Aase | F15D 1/10 |
| | | | 180/68.1 |
| 2011/0300358 A1* | 12/2011 | Blohowiak | B32B 5/12 |
| | | | 148/516 |
| 2018/0292845 A1 | 10/2018 | Smith et al. | |
| 2019/0382063 A1 | 12/2019 | Mcafee et al. | |

OTHER PUBLICATIONS

Laminated Composite Plates (Year: 2000).*
What is Additive Manufacturing? U.S. Department of Energy https://www.youtube.com/watch?v=_mhN1d76808&t=10s (Year: 2017).*

* cited by examiner

DEPLOYED STATE

PARKED STATE

COMPOSITE PANELS AND SYSTEM FOR ACTIVE FLOW CONTROL ON MOTOR VEHICLES

FIELD

The present invention relates to multi-stable panels, and in particular to large automotive multi-stable panels for active flow control.

BACKGROUND

The statements in this section merely provide background information related to the present disclosure and may not constitute prior art.

Aerodynamics can plan an important role in defining vehicle range and fuel mileage. As electric vehicles become increasingly common, aerodynamics thus plays an ever more important role. At higher speeds, the airflow around and through a motor vehicle begins to have a more pronounced effect on the acceleration, top speed, fuel efficiency and handling.

Moreover, aerodynamics is just one of the requirements of the vehicle exterior. The exterior shape of a vehicle is also defined by other aspects, including design space, package space, functionality, power requirements, and off road capabilities, among others. Therefore, creating an exterior surface which has the ability to adapt to varying driving conditions can enable the vehicle to improve its range without sacrificing performance in other areas.

Active aerodynamic devices are designed to be reoriented or repositioned while the automobile is in motion to adjust the aerodynamic properties of the vehicle. Examples include retractable spoilers and rear wings. However, common active aerodynamic devices can be bulky, heavy, and complex. As such, cost, package space and weight are often barriers to implementation. And on standard production vehicles, vehicle performance and cost are often times at odds with each other.

This present disclosure addresses these challenges related to aerodynamic or airflow control, among other issues related to the aerodynamic performance and efficiency of motor vehicles.

SUMMARY

This section provides a general summary of the disclosure and is not a comprehensive disclosure of its full scope or all of its features.

In one form, the present disclosure provides a composite panel having a matrix, shape memory fibers disposed within the matrix, a plurality of slits, and an electrical termination area coupled to the shape memory fibers. The plurality of slits are arranged parallel to each other and extend through at least a portion of a thickness of the composite panel.

In variations of this form, which may be implemented individually or in any combination: structural fiber reinforcements are disposed within the matrix; the matrix and shape memory fibers are arranged in a laminate configuration; a portion of the laminate configuration is balanced and symmetrical and another portion of the laminate proximate the slits is unbalanced and asymmetrical; the composite panel defines a trapezoidal shape; the plurality of slits extend through an entire thickness of the composite panel; the shape memory fibers are piezo electric; the composite panel further comprises at least one aerodynamic film layer disposed over the plurality of slits such that an outer moldline surface of the composite panel is continuous; the composite panel further comprises a concentration of electrically conductive fibers disposed at a leading edge of the composite panel, the electrically conductive fibers coupled to the electrical termination area; and the matrix and shape memory fibers are manufactured using an additive manufacturing process such that the composite panel defines an asymmetrical material layout.

The present disclosure further provides a system for active air control. The system includes a power supply and a composite panel, wherein the composite panel includes a matrix, structural fiber reinforcements disposed within the matrix, shape memory fibers disposed within the matrix, a plurality of slits, and an electrical termination area coupled to the shape memory fibers and the power supply. The plurality of slits are arranged parallel to each other and extend through at least a portion of a thickness of the composite panel. The power supply is configured to apply a burst voltage to the composite panel and change a shape of the composite panel (e.g., from a parked state to a deployed state, or from a deployed state to a parked state, or from a deployed state to another alternative deployed state), thereby modifying an airflow extending across the composite panel during operation.

In variations of this form, which may be implemented individually or in any combination: the composite panel defines a trapezoidal shape; the shape memory fibers are piezo electric; the matrix, structural fiber reinforcements, and shape memory fibers are arranged in a laminate configuration; a portion of the laminate configuration is balanced and symmetrical and another portion of the laminate proximate the slits is unbalanced and asymmetrical; the matrix and structural fiber reinforcements are preimpregnated and the structural fiber reinforcements are continuous; the system further comprises a sensor to detect an operational characteristic of the airflow and a controller in communication with the sensor configured to send signals to the power supply to apply the burst voltage; and the sensor is a speed sensor.

In yet another form, the present disclosure also provides a system for active air control. The system includes a power supply and a composite panel, wherein the composite panel includes a matrix, actuator elements secured to at least one exterior surface of the composite panel, a plurality of slits, and an electrical termination area coupled to the shape memory elements and the power supply. The plurality of slits are arranged parallel to each other and extend through at least a portion of a thickness of the composite panel. The power supply is configured to apply a burst voltage to the composite panel and change a shape of the composite panel (e.g., from a parked state to a deployed state, or from a deployed state to a parked state, or from a deployed state to another alternative deployed state), thereby modifying an airflow extending across the composite panel during operation.

In variations of this form, which may be implemented individually or in any combination: the matrix and shape memory fibers are arranged in a laminate configuration, and a portion of the laminate configuration is balanced and symmetrical and another portion of the laminate proximate the slits is unbalanced and asymmetrical.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
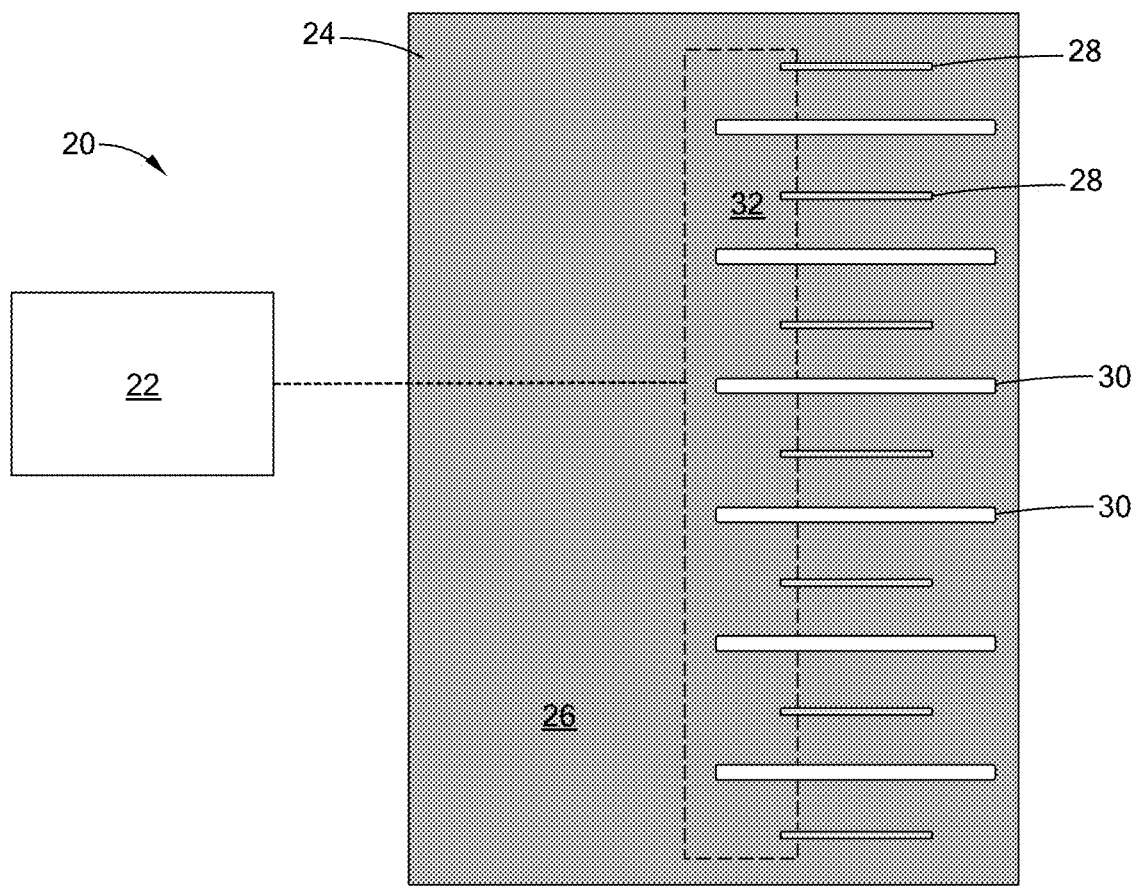
FIG. 1 is a schematic view of a system for active air control, according to the teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Referring to FIG. 1, a system for active air control is illustrated and generally indicated by reference numeral 20. The system includes a power supply 22 operatively connected to a composite panel 24. As described in greater detail below, the power supply 22 is configured to apply a voltage to the composite panel 24, which in one form is a burst voltage, to change a shape of the composite panel 24. More specifically, the applied voltage changes the shape of the composite panel from a parked state to a deployed state, or from a deployed state to a parked state, or from a deployed state to another alternative deployed state, thereby modifying an airflow extending across the composite panel 24 during operation, or while driving above a predetermined speed.

The composite panel 24 includes a matrix 26, actuator elements 28 (such as shape memory elements or shape memory fibers, by way of example) disposed within the matrix 26, a plurality of slits 30, and an electrical termination area 32. The actuator elements 28 may be secured to at least one exterior surface of the composite panel 24 rather than being disposed within the matrix 26 of the composite panel 24, which is described in greater detail below. The plurality of slits 30 are arranged parallel to each other as shown and extend through at least a portion of a thickness of the composite panel 24. In one form, the slits 30 extend through the entire thickness of the composite panel 24, thereby creating openings. The electrical termination area 32 is electrically coupled to the actuator elements 28 and the power supply 22, and thus the electrical termination area 32 is embedded at least partially within the composite panel 24. Further details of the composite panel 24, its matrix 26, and various reinforcements and manufacturing methods are described in greater detail below.

Generally, the shape memory fibers may be any of a variety of materials that change shape based on an applied voltage or stimulus (e.g., light, temperature, pH, magnetism, electricity, or moisture, among others). Accordingly, the shape memory fibers may include by way of example, coated carbon fibers (e.g., silver polypyrrole (PPy)), shape-memory polymers (SMPs) mixed with conductive particles, including conductive nanoparticles, and metal-based fibers (e.g., NiTi alloy, copper alloy), among others. Another example includes a conductive network of linked nanostructures is described in pending application Ser. No. 17/873,721 and titled "Conductive Motor Vehicle Paint Enabling Wind Drag Reduction," which is commonly assigned with the present application and the contents of which are incorporated herein by reference in their entirety.

The ability to be stable in multiple states depends on the geometry and pre-stress applied to the composite panel 24. Thus, the composite panel 24 can be manufactured from a variety of different matrix materials and reinforcing fibers depending on the application and loading conditions. For example, the matrix 26 can be thermoset or thermoplastic, and the reinforcing fibers can be continuous or discontinuous. Further, the fibers can be carbon, glass, or para-aramid, among others. In another form, the composite panel 24 is made from a plurality of layers of different pre-stressed fiber-less plastics. In this form, the composite panel is manufactured using additive manufacturing, or 3D printing.

Generally, the functional states of multi-stable materials are obtained from their ability to deflect elastically. The composite panel 24 is thus tailored to various loading conditions, both static and dynamic, of varying magnitudes, in order to be deflected to a predetermined position. Thus, it should be appreciated that a variety of geometries and materials for the composite panel 24 can be employed while remaining within the scope of the present disclosure.

Figure 2B:
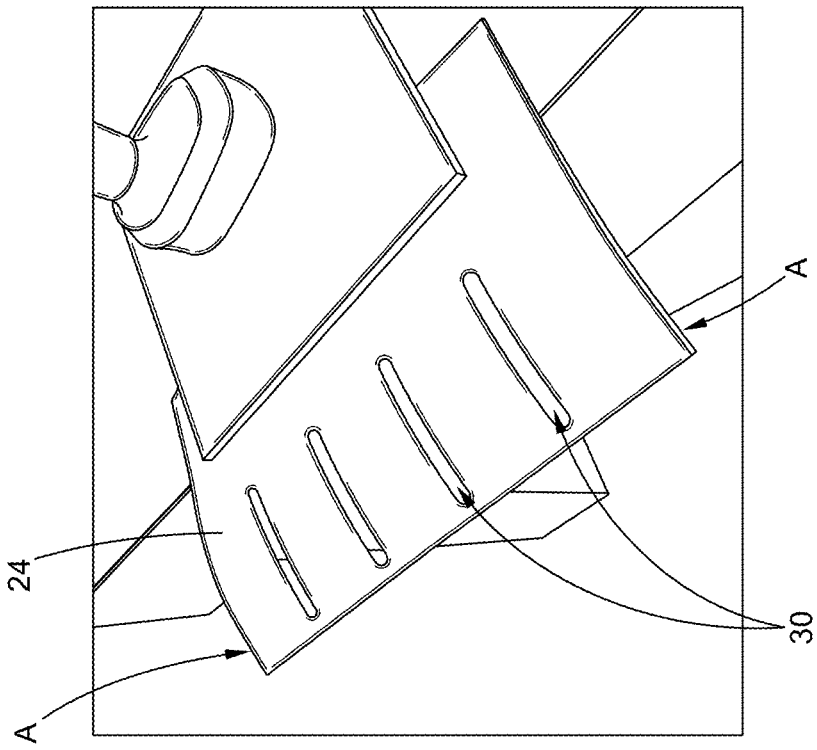
FIG. 2B is a perspective view of a composite panel in a deployed state according to the teachings of the present disclosure.
Figure 2A:
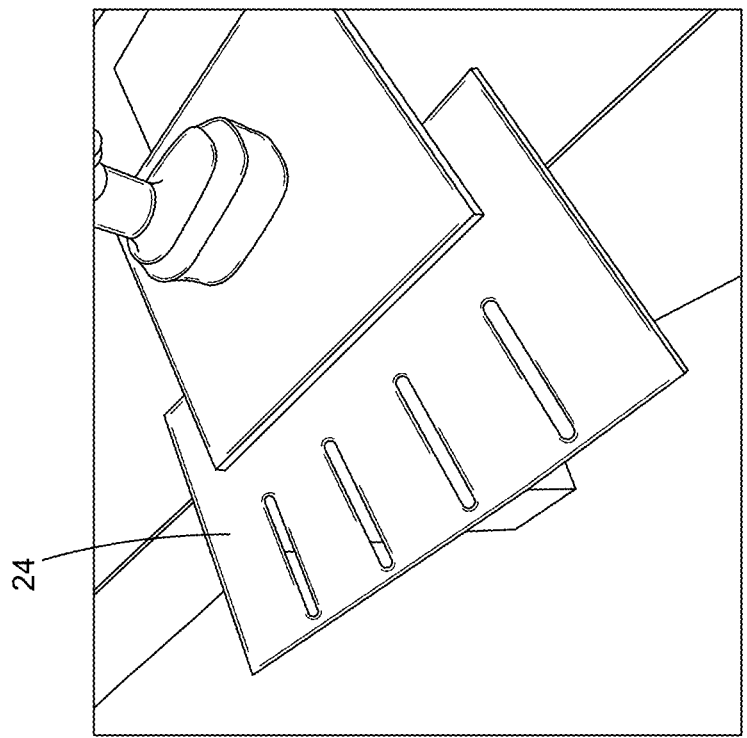
FIG. 2A is a perspective view of a composite panel in a parked state according to the teachings of the present disclosure.

Referring now to FIGS. 2A-2B, the composite panel 24 is configured to be stable, or not to undergo any deflection in a parked state (FIG. 2A), and then to undergo deflection in a deployed state (FIG. 2B) through application of voltage from the power supply 22 (not shown) and through the specific design of the composite panel 24. In one variation, the parked state is a generally flat plate configuration, and the deployed state is a curved panel, wherein the curved portion is proximate the slits 30 as shown. Conversely, in yet another form, the parked state is a curved panel and the deployed state is a flat plate configuration. In another form, the parked state may be a curved panel have a first degree of curvature, and the deployed state may have a higher degree of curvature. These and other variations of shapes for the parked and deployed state should be construed to be within the scope of the present disclosure. In other forms, both the parked state and the deployed state may define different geometrical configurations and curvatures as a function of application requirements. For example, the deployed shape may include a higher curvature at one edge "A" and a lower curvature along edge "B." This difference in curvature can be accomplished through the design of the composite panel 24 (described in greater detail below) and/or the amount of power selectively applied to the actuator elements 28. More specifically, the electrical termination area 32 and power supply 22 can be configured to independently apply voltage to one or more actuator elements 28 in zones. Advantageously, independent activation of the actuator elements 28 can be combined with the specific tailored properties of the composite panel 24 as described herein to provide multiple stable states. This ability to tailor not only the material properties but also the actuation method enables the composite panel 24 to assist in flow control taking into consideration a variety of environmental factors.

Figure 3:
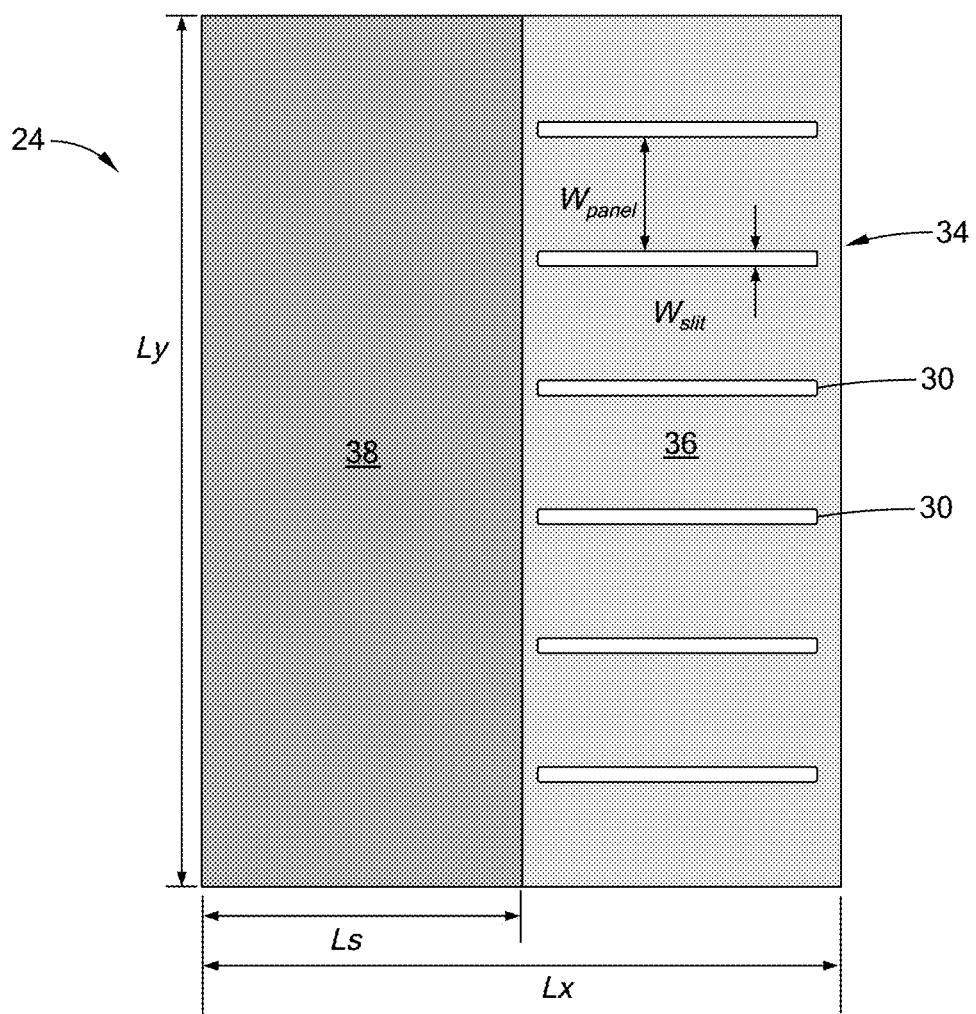
FIG. 3 is a schematic view of a composite panel defining a rectangular shape, according to the teachings of the present disclosure.

Referring to FIG. 3, the composite panel 24 in one form defines a parallelogram, which may be a rectangle as shown or other forms, such as a rhomboid. In this form, the composite panel 24 has a short edge with a length Lx and a long edge with a length Ly. The composite panel 24 includes a trailing edge 34, which is the moveable edge by which the airflow is controlled during operation of the motor vehicle, thereby impacting the aerodynamics forces on the motor vehicle.

In one form, the actuator elements 28 are shape memory fibers embedded in the matrix 26, which is arranged in a laminate configuration. More specifically, individual plies of composite material having the shape memory fibers (and/or other fibers) embedded in the matrix 26 (often referred to as a "prepreg" with the fibers preimpregnated with the resin/matrix) are stacked on top of each other with the fibers being arranged in different orientations. The term "laminate" shall be used herein to indicate a specific stack or arrangement of individual plies (also referred to as a "layup") in different orientations, examples of which are described below.

The composite panel 24 includes movable portion 36 and fixed portion 38 as shown, where the laminate in the portion near the leading edge 34 is different than the laminate of plies away from the leading edge. Further, in this form, the plies in the movable portion 36 includes the shape memory fibers, whereas the plies in the fixed portion 38 do not include shape memory fibers and instead include other conventional fiber reinforcements, such as by way of example carbon fibers or glass fibers. It should be understood, however, that the fixed portion 38 may also include shape memory fibers while remaining within the scope of the present disclosure. Further, a combination of shape memory fibers and other types of fibers may be combined together in either or both portions 36/38.

When referring to characteristics of the laminate, two terms are specifically used herein, namely a "balanced" laminate and a "symmetric" laminate when viewing the layup of plies through the thickness of the laminate. A balanced laminate is one in which there are equal numbers of plies in a plus and minus orientation, such as two +45° plies and two −45° plies. A symmetric laminate is one in which the plies are symmetric relative to a mid-plane of the laminate. For example, a laminate with layup, or stacking sequence of 0/90/+45/−45/−45/+45/90/0, which is written $[0/90/\pm45]_2$ is both balanced and symmetric.

In one example of the present disclosure, fixed portion 38 has a layup of $[0_2/0_2]$ (or $[0_2]_2$, which is balanced and symmetric, while movable portion 36 has a layup of $[90_2/0_2]$, which is balanced but is asymmetric. Accordingly, the asymmetry of the layup of movable portion 36 will contribute positively to the deflection of the composite panel 24 when the voltage is applied.

As further shown, the slits 30 have a specific width ($W_{slit}$) and extend across the movable portion 36 parallel to the length $L_x$. The slits 30 generally provide reduced bending stiffness to the overall composite panel 24, thereby allowing the composite panel 24 to be deflected more easily with the application of voltage. As a result, the addition of the slits 30 allows the composite panel 24 to be a larger size for a given voltage level. Thus, the unique combination of shape memory fibers being activated with voltage, a specific laminate design, and the slits 30, the composite panel 24 can be activated to a deployed state, thereby modifying an airflow extending across the composite panel 24 during operation. It should be understood that different shapes and orientations of the slits 30 may be implemented while remaining within the scope of the present disclosure.

Figure 4:
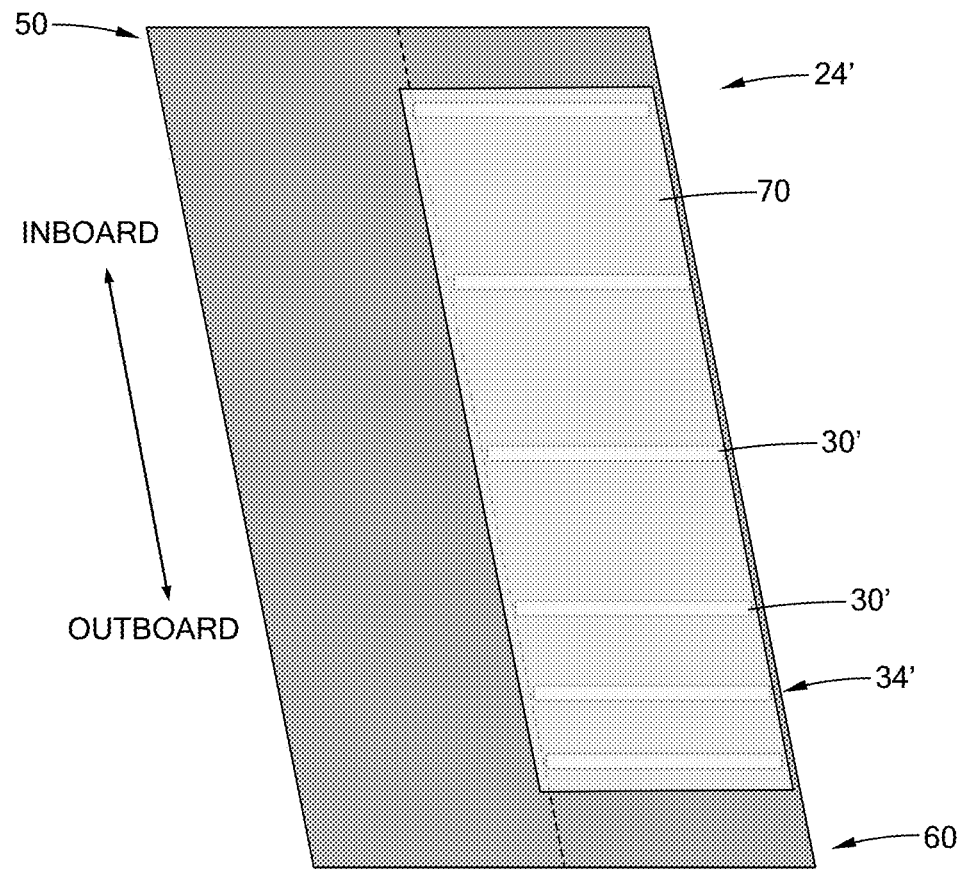
FIG. 4 is a schematic view of a composite panel defining a trapezoidal shape, according to the teachings of the present disclosure.

For example, and with reference to FIG. 4, the composite panel 24' includes an angled leading edge 34' and slits 30', which defines a trapezoidal shape. Although the panel 24' shown is a trapezoidal shape, other geometrical shapes may be utilized and remain within the scope of the present disclosure. The slits 30' are spaced unevenly to accommodate specific loading conditions and to effect a specific amount of deflection per region of the composite panel 24'. In this example, the loads may be higher at an outboard portion 50 compared with an inboard portion 60, and if higher deflections are needed at the outboard portion, the slits 30' are spaced closer to each other. It should be understood that this specific tailoring of slits 30' may also be independent of loading conditions while remaining within the scope of the present disclosure.

In a variation of the present disclosure, an aerodynamic film 70 is disposed onto the composite panel 24' to cover the slits 30', thereby creating a more aerodynamic surface while the slits 30' still function to reduce the bending stiffness of the composite panel 24. The aerodynamic film 70 may be a single sheet as shown, or may be applied individually over each slit 30/30'.

In operation, the voltage applied to the actuator elements 28 actuates the composite panel 24 between the parked and various deployed states. In one form, the actuator elements 28 are macro fiber composite (MFC) actuators, or shape memory elements, one form of which are provided by Smart Material Corporation. Generally, the MFC actuators comprise piezo ceramic elements disposed between layers of adhesive, electrodes, and a dielectric film (such as by way of example, polyimide). The electrodes are electrically connected to the piezo ceramic elements, and thus the voltage is applied through the electrical termination area 32 to the electrodes of the MFC actuators, which activates the piezo ceramic elements, causing the MFC actuators to bend or deflect. Further, the MFC actuators are configured to move in expansion, bending, or torsion. The operation of MFC actuators are described in greater detail in U.S. Pat. No. 6,629,341, the contents of which are incorporated herein by reference in their entirety. Accordingly, one variation of the MFC actuators may be used to harvest energy from vibrations or kinetic energy. This energy can then be used to provide power to the composite panel 24 rather than, or in addition to a separate power supply 22. Rather than being embedded within the laminate of the composite panel 24, these MFC actuators are mounted to an external surface, or surfaces, of the composite panel 24 as described in greater detail below.

The activation voltage of the actuator elements 28 is a function of the specific composite panel 24 design (e.g., laminate, dimensions, thickness), and in various forms is between −500 Volts and +1500 Volts, with a maximum power of about 2 Watts at 1500 Volts. Although MFC actuators are relatively light and use low power, other actuation means may be employed with the composite panel 24 while remaining within the scope of the present disclosure. For example, certain shape memory alloys may be employed. Accordingly, the specific types and layout of the actuator elements 28 within a particular composite panel 24 is tailored for the specific performance requirements of the application.

Figure 5A:
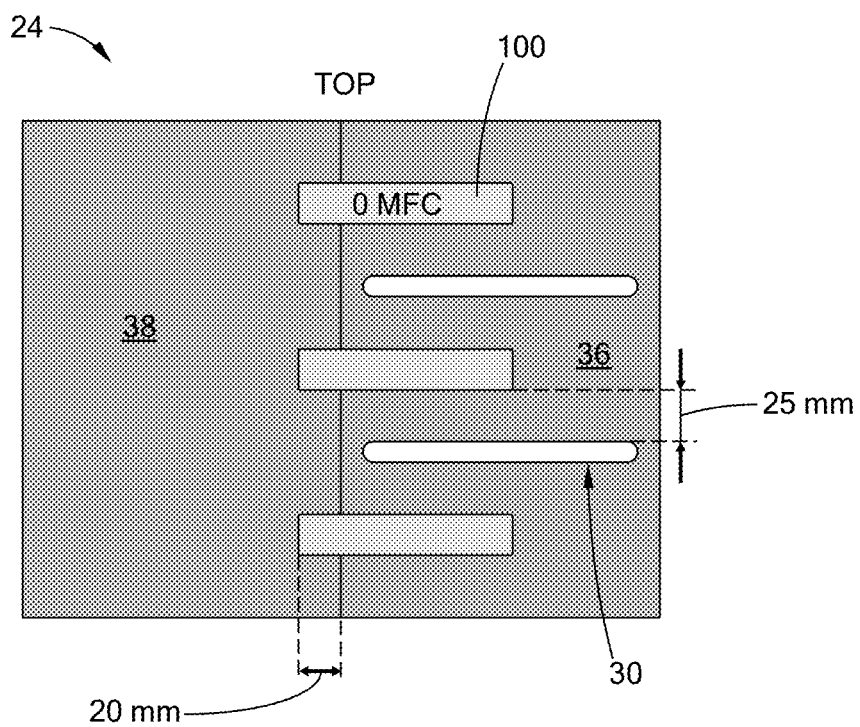
FIG. 5A is a schematic view of a composite panel having macro fiber composite (MFC) actuators mounted to a top surface thereof according to the teachings of the present disclosure.
Figure 5B:
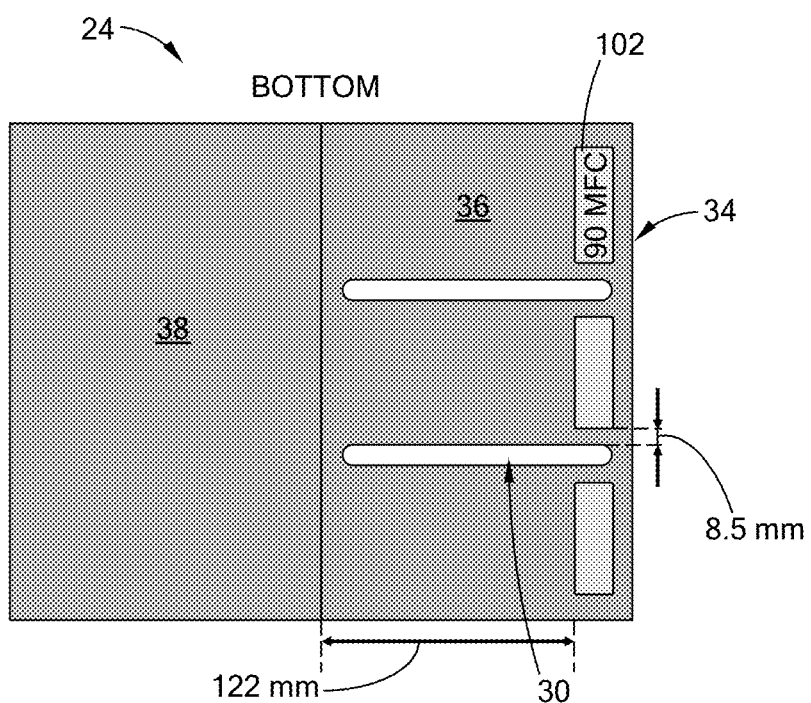
FIG. 5B is a schematic view of a composite panel having macro fiber composite (MFC) actuators mounted to a bottom surface thereof according to the teachings of the present disclosure.

Another example is shown in FIGS. 5A, wherein the top of the composite panel 24 is shown in FIG. 5A and the bottom of the composite panel is shown in FIG. 5B. On the top of the composite panel 24, three (3) MFC actuators 100 are mounted parallel to the slits 30 and at a distance of about 25 mm from an adjacent edge of the slit 30 as shown. The MFC actuators 100 extend from the fixed portion 38 (about 20 mm) across to the movable portion 36. These MFC actuators 100 are part number M8514-P1 from Smart Materials Corp. On the bottom of the composite panel 24, three (3) MFC actuators 102 are mounted perpendicular to the slits 30 and are near the leading edge 34. The MFC actuators 102 are spaced about 122 mm from the fixed portion 38 and about 8.5 mm from an adjacent edge of a slit 30 as shown. These MFC actuators 102 are part number M4312-P1 from Smart Materials Corp. It should be understood that the specific MFC actuator and mounting configuration will be tailored to the design of the composite panel 24, including the laminate configuration.

Figure 6:
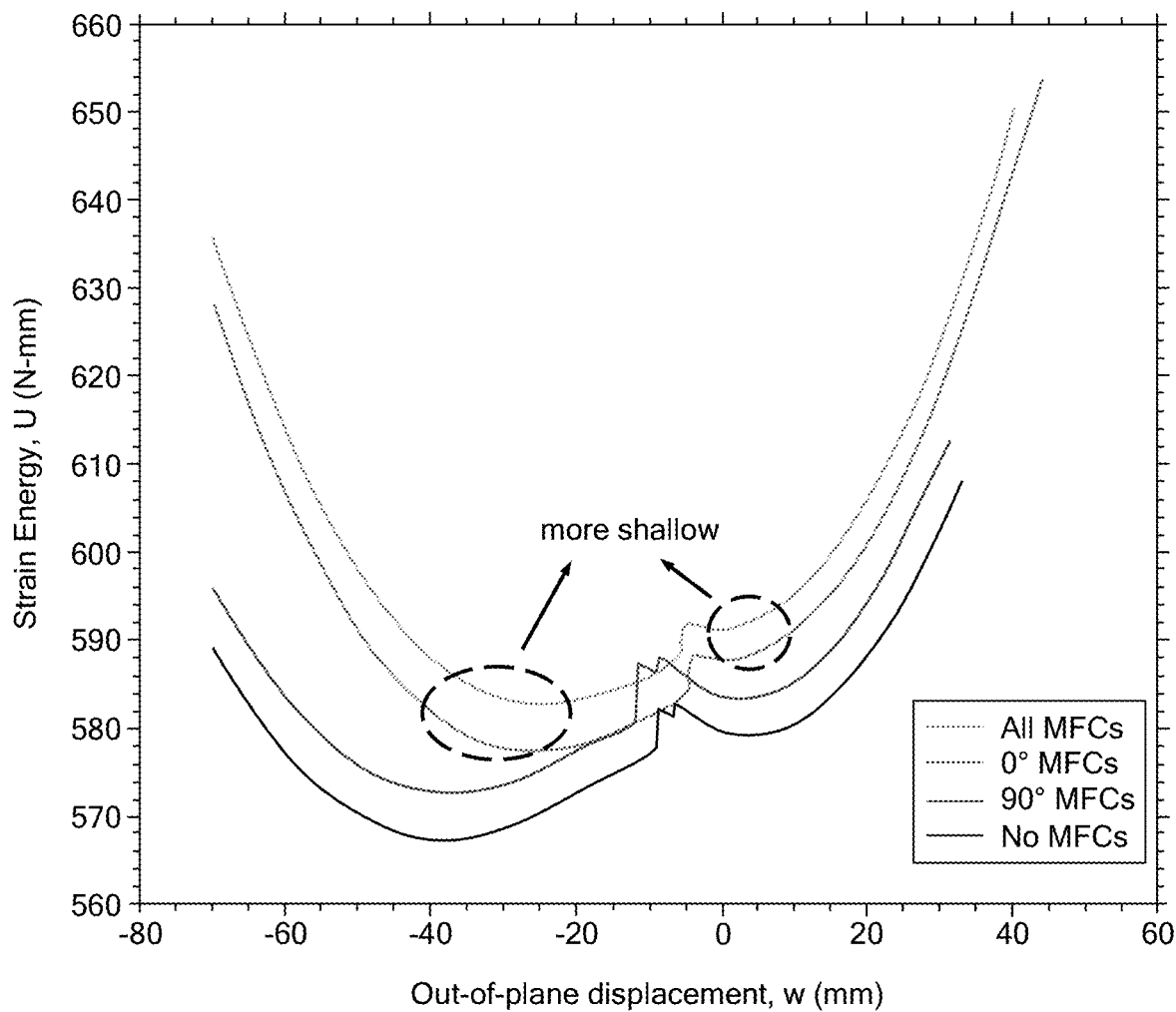
FIG. 6 is a graph illustrating out-of-plane displacement versus strain energy for various MFC actuators based on the composite panel design of FIGS. 5A and 5B.

Referring to FIG. 6, the displacement versus strain energy is illustrated for various configurations of MFC actuators 100/102 based on the design of FIGS. 5A and 5B. While the MFC actuators 100/102 increase the strain energy, stable states still exist as illustrated by the inflection points of each curve. Therefore, the MFC actuators can actively change a shape of the composite panel 24, for example from a parked state to a deployed state, or from a deployed state to a parked state, or from a deployed state to another alternative deployed state, thereby modifying an airflow extending across the composite panel 24 during operation.

Figure 7:
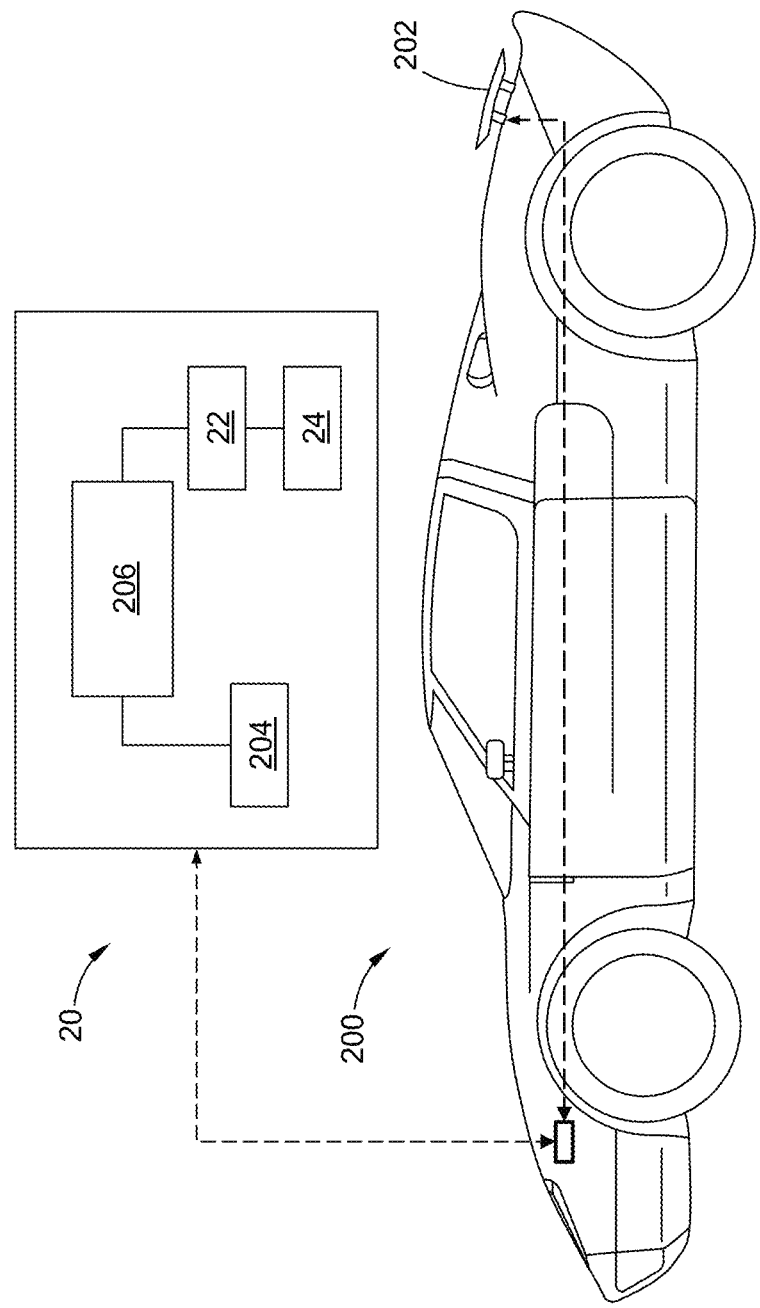
FIG. 7 is a schematic view of a motor vehicle having the system for active air control according to the teachings of the present disclosure.

With reference now to FIG. 7, the system 20 is shown integrated with an exemplary motor vehicle 200, where a rear spoiler 202 is configured as a composite panel 24 described above. The system 20 includes a sensor 204 in communication with a controller 206, wherein the sensor 204 detects an operational characteristic of the airflow. Operational characteristics of the airflow may include, by way of example, velocity or speed (magnitude and direction), density, and turbulence, among others. For example, the sensor 204 may be a speed sensor or a turbulence sensor (e.g., hot wire anemometer). The controller 206 is configured to send signals to the power supply 22 based on the signals received from the sensor 204, to apply the burst voltage to the composite panel 24/spoiler 202, thereby changing the shape of the spoiler 202 based on the operational characteristics of the airflow. More specifically, the applied voltage changes the shape of the spoiler 202 from a parked state to a deployed state, thereby modifying an airflow extending across the spoiler 202 during operation, or while driving above a predetermined speed. The controller 206 may be a part of an electronic control unit (ECU) of the motor vehicle 200, which controls one or more electrical systems of the motor vehicle 200. It should be understood that this motor vehicle 200 and spoiler 202 are merely exemplary, and the teachings of the present disclosure may be applied to a variety of parts/components of a motor vehicle while remaining within the scope of the present disclosure.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

In this application, the term "controller" and/or "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components (e.g., op amp circuit integrator as part of the heat flux data module) that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:
1. A composite panel comprising:
    a matrix;
    shape memory fibers disposed within the matrix;
    a plurality of slits extending through at least a portion of
        a thickness of the composite panel, the plurality of slits being open and exposed to an external surface of the composite panel and arranged parallel to each other; and an electrical termination area coupled to the shape memory fibers.

2. The composite panel according to claim 1, further comprising structural fiber reinforcements disposed within the matrix.

3. The composite panel according to claim 1, wherein the matrix and shape memory fibers are arranged in a laminate configuration.

4. The composite panel according to claim 3, wherein a portion of the laminate configuration is balanced and symmetrical and another portion of the laminate configuration proximate the plurality of slits is unbalanced and asymmetrical.

5. The composite panel according to claim 1, wherein the composite panel defines a trapezoidal shape.

6. The composite panel according to claim 1, wherein the plurality of slits extend through an entire thickness of the composite panel.

7. The composite panel according to claim 1, further comprising at least one aerodynamic film layer disposed over the plurality of slits such that an outer moldline surface of the composite panel is continuous.

8. The composite panel according to claim 1, wherein the shape memory fibers are piezo electric.

9. The composite panel according to claim 1, further comprising a concentration of electrically conductive fibers disposed at a leading edge of the composite panel, the electrically conductive fibers coupled to the electrical termination area.

10. The composite panel according to claim 1, wherein the matrix and shape memory fibers are manufactured using an additive manufacturing process such that the composite panel defines an asymmetrical material layout.

11. A system for active airflow control, the system comprising:
a power supply; and
a composite panel comprising:
a matrix;
structural fiber reinforcements disposed within the matrix;
shape memory fibers disposed within the matrix;
a plurality of slits extending through at least a portion of a thickness of the composite panel, the plurality of slits being open and exposed to an external surface of the composite panel and arranged parallel to each other; and
an electrical termination area coupled to the shape memory fibers and the power supply,
wherein the power supply is configured to apply a burst voltage to the composite panel and change a shape of the composite panel, thereby modifying an airflow extending across the composite panel during operation.

12. The system for active airflow control according to claim 11, wherein the composite panel defines a trapezoidal shape.

13. The system for active airflow control according to claim 11, wherein the shape memory fibers are piezo electric.

14. The system for active airflow control according to claim 11, wherein the matrix, structural fiber reinforcements, and shape memory fibers are arranged in a laminate configuration.

15. The system for active airflow control according to claim 14, wherein a portion of the laminate configuration is balanced and symmetrical and another portion of the laminate configuration proximate the plurality of slits is unbalanced and asymmetrical.

16. The system for active airflow control according to claim 14, wherein the matrix and structural fiber reinforcements are preimpregnated and the structural fiber reinforcements are continuous.

17. The system for active airflow control according to claim 14, further comprising:
a sensor to detect an operational characteristic of the airflow; and
a controller in communication with the sensor and configured to send signals to the power supply to apply the burst voltage.

18. The system for active airflow control according to claim 17, wherein the sensor is a speed sensor.

19. A system for active airflow control, the system comprising:
a power supply; and
a composite panel comprising:
a matrix;
structural fiber reinforcements disposed within the matrix;
actuator elements secured to at least one exterior surface of the composite panel;
a plurality of slits extending through at least a portion of a thickness of the composite panel, the plurality of slits being open and exposed to an external surface of the composite panel and arranged parallel to each other; and
an electrical termination area coupled to the actuator elements and the power supply,
wherein the power supply is configured to apply a burst voltage to the actuator elements and change a shape of the composite panel, thereby modifying an airflow extending across the composite panel during operation.

20. The system for active airflow control according to claim 19, wherein the matrix and structural fiber reinforcements are arranged in a laminate configuration, and a portion of the laminate configuration is balanced and symmetrical and another portion of the laminate configuration proximate the plurality of slits is unbalanced and asymmetrical.

\* \* \* \* \*